United States Patent
Beeler

(10) Patent No.: US 8,917,317 B1
(45) Date of Patent: Dec. 23, 2014

(54) SYSTEM AND METHOD FOR CAMERA CALIBRATION

(75) Inventor: Thabo Dominik Beeler, Grison (CH)

(73) Assignee: Disney Enterprises, Inc., Burbank, CA (US)

(*) Notice: Subject to any disclaimer, the term of this patent is extended or adjusted under 35 U.S.C. 154(b) by 980 days.

(21) Appl. No.: 12/689,173

(22) Filed: Jan. 18, 2010

(51) Int. Cl.
*H04N 13/02* (2006.01)
*G01B 11/25* (2006.01)
*G06T 7/00* (2006.01)
*G01B 11/245* (2006.01)

(52) U.S. Cl.
CPC .......... *G01B 11/2504* (2013.01); *G06T 7/0042* (2013.01); *G01B 11/245* (2013.01)
USPC ............................................. 348/47; 382/154

(58) Field of Classification Search
CPC .............. G01B 11/245; G01B 11/2504; G06F 3/04845; G06K 9/32; G06T 17/10; G06T 2200/08; G06T 2207/30244; G06T 7/0042; G06T 7/0065
USPC ..................................... 348/47, 139; 382/154
See application file for complete search history.

(56) References Cited

U.S. PATENT DOCUMENTS

| | | | |
|---|---|---|---|
| 5,991,437 A * | 11/1999 | Migdal et al. ................. | 382/154 |
| 6,858,826 B2 * | 2/2005 | Mueller et al. ............. | 250/208.1 |
| 2004/0247174 A1 * | 12/2004 | Lyons et al. .................. | 382/154 |
| 2010/0245541 A1 * | 9/2010 | Zhao et al. ...................... | 348/45 |

* cited by examiner

*Primary Examiner* — Sath V Perungavoor
*Assistant Examiner* — Dakshesh Parikh
(74) *Attorney, Agent, or Firm* — Patterson + Sheridan, LLP

(57) ABSTRACT

A method for calibrating a plurality of cameras. The method includes: for each camera, detecting a projection of a proxy object included in an image captured by the camera; for each camera, detecting surface features associated with the proxy object included in the image captured by the camera; for each combination of two different cameras, determining a correspondence set that maps the detected surface features associated with the proxy object included in the image captured by one camera to the detected surface features associated with the proxy object included in the image captured by the other camera; and generating correspondences between features based on relationships between the different correspondence sets, wherein the correspondences between features can be processed by a camera calibration toolbox to generate camera calibration parameters for each camera in the plurality of cameras.

26 Claims, 6 Drawing Sheets

SYSTEM AND METHOD FOR CAMERA CALIBRATION

BACKGROUND

1. Field of the Invention

The present invention relates to the field of computer graphics and, in particular, to a system and method for camera calibration.

2. Description of the Related Art

Recently there has been an increasing demand for three-dimensional (3D) face models. The movie industry relies more and more on computer graphics (CG) to place human actors in situations that are physically not feasible. In some situations, the actor is completely replaced by a corresponding virtual counterpart since the required shots would endanger the actor.

To integrate the actors or their CG representations seamlessly, light and shadows cast from other objects must be matched. Conventional approaches using coarse facial models are not sufficient since the human eye is trained to read faces, so even subtle imperfections are spotted immediately. Also, secondary effects, such as wrinkle formation, are especially hard and tedious to create for an animator, but these secondary effects are essential for natural face appearance.

Physical simulation is currently being investigated for facial capture but is very difficult to implement since the human face is a highly complex and non-linear structure. Currently, the only practical option is to acquire a model of the face using 3D capture. The acquired models can be either integrated directly into a movie or can be used to control other faces. In addition, the movie industry is not the only industry that demands realistic face models. Computer games have a demand for virtual characters. Also, medical science has an interest in such models.

Camera calibration is an important procedure for any image-based 3D shape reconstruction of objects. Camera calibration is the process of determining parameters for the one or more cameras that capture a scene. Typically, camera calibration parameters include intrinsic parameters and extrinsic parameters. Typical examples of intrinsic parameters include focal length, image format, principal point, and/or lens distortion. The extrinsic parameters define the position and orientation of the camera in world space coordinates relative to the subject being captured.

Most 3D reconstruction techniques require the cameras to be calibrated to generate accurately reconstructed models. Conventional approaches to camera calibration involve a checkerboard pattern. The checkerboard pattern is placed at different angles relative to a camera and a sequence of images is captured by the camera. An algorithm then detects the grid pattern in the images captured by the camera and computes the intrinsic and extrinsic parameters based on the detected grid patterns. The checkerboard approach works well for a few cameras, e.g., one or two cameras, but this approach breaks down for multi-view settings due to mutual visibility constraints. For example, when the goal is to capture a subject from all sides, then cameras need to be placed all around the subject. With the checkerboard approach, there is no way to see the checkerboard from every camera. Previous approaches to calibrate multiple cameras typically rely on many images (e.g., more than 500 images) and are thus cumbersome to be carried out.

As the foregoing illustrates, there is a need in the art for an improved technique for camera calibration.

SUMMARY

Embodiments of the invention provide a technique for fast, accurate, robust, and automatic multi-camera calibration.

Embodiments of the invention use a sparse, outlier-free set of accurately localized "features" placed on a proxy object. In one embodiment, a spherical proxy may be used to enable accurate localization and correct matching. Using a spherical proxy is beneficial since the projection of a sphere is approximately a circle under normal imaging conditions (e.g., low lens distortion, small field of view), the geometry is simple for calculations, normals can be easily estimated, and the surface is equally fair to all viewpoints.

One embodiment of the invention provides a computer-implemented method for calibrating a plurality of cameras. The method includes: for each camera in the plurality of cameras, detecting a projection of a proxy object included in an image captured by the camera; for each camera in the plurality of cameras, detecting surface features associated with the proxy object included in the image captured by the camera; for each combination of two different cameras in the plurality of cameras, determining a correspondence set that maps the detected surface features associated with the proxy object included in the image captured by one camera in the combination of two different cameras to the detected surface features associated with the proxy object included in the image captured by the other camera in the combination of two different cameras. The different correspondence sets are then processed such that the feature correspondences over all images are formed. These feature correspondences can be processed by a camera calibration toolbox to generate camera calibration parameters for each camera in the plurality of cameras.

One advantage of embodiments of the invention is simplicity of implementation compared to prior art techniques. In contrast to prior art approaches, such as the checkerboard approach, every feature does not need to be visible to each camera when calibrating using embodiments of the invention.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
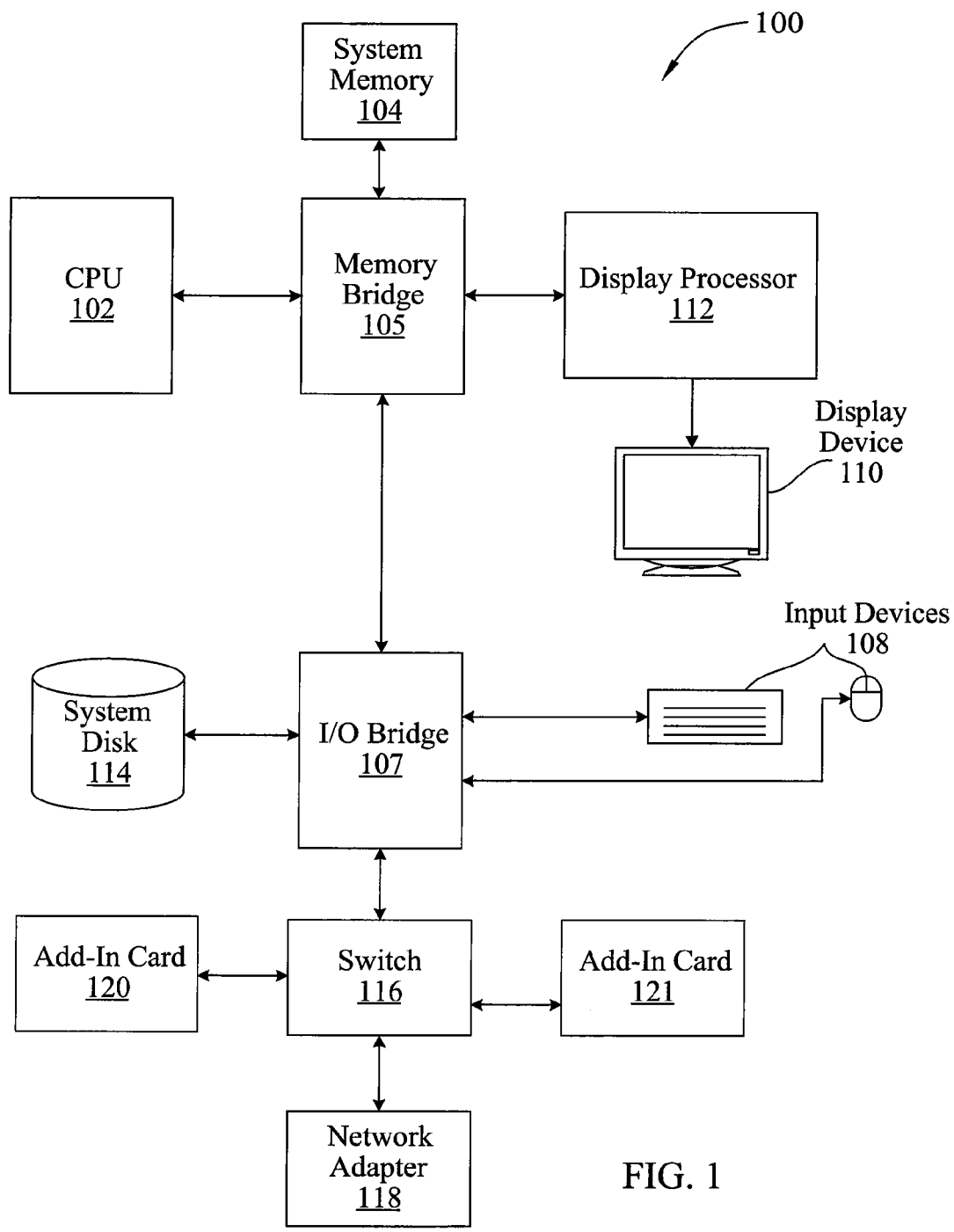
FIG. 1 is a block diagram of a system configured to implement one or more aspects of the present invention.

Embodiments of the invention provide a technique for fast, accurate, robust, and automatic multi-camera calibration.

Embodiments of the invention use a sparse, outlier-free set of accurately localized "features" placed on a proxy object. In one embodiment, a spherical proxy may be used to enable accurate localization and correct matching. Using a spherical proxy is beneficial since the projection of a sphere is approximately a circle under normal imaging conditions (e.g., low lens distortion, small field of view), the geometry is simple for calculations, normals can be easily estimated, and the surface is equally fair to all viewpoints.

One embodiment for camera calibration involves using a sphere as a proxy for the subject when performing camera calibration. In alternative embodiments, any shape proxy may be used. In some embodiments, the sphere is approximately the same size as the subject that is to be captured. Also, in some embodiments, the sphere has a color that is distinct from the background. As described in greater detail herein, in some embodiments, the sphere includes "features" that are placed on the outside of the sphere. The sphere is then captured with multiple, i.e., two or more, cameras placed around the sphere. For each image, the projection of the sphere, which is approximately a circle, is detected. The sphere can be reconstructed based on the circular projection of the sphere. In some embodiments, the physical radius of the sphere is known and is used in reconstructing the sphere. In other embodiments, the radius of the sphere is unknown, but can be approximated.

For each image, the features are detected on the sphere. As described in greater detail below, the features may be of a specific "type" or design. In some embodiments, each feature has a circular shape having a checkerboard pattern and a colored dot at the center. A distinct color may be used for the colored dot that can be easily and robustly detected by applying a band-pass filter to the spectral distribution. After the features are detected for each image, correspondences are found between features in pairs of images. In one embodiment, the features of two images I1, I2 are projected onto estimated spheres S1, S2, respectively. A RANSAC (Random Sample Consensus) operation may be applied to find a rotation R that best aligns the features from the two views. In some embodiments, "dual" features may be included in addition to "regular" features to allow for faster detection of correspondences, as described in greater detail herein. Once correspondences are determined for each pair of images, the correspondences are filtered to refine the position of sphere S2 and the rotation R to minimize the error of each correspondence in 3-space. Also, the correspondences with an error above a certain threshold can be filtered out. Additionally, in some embodiments, correspondence sets with an overall error substantially above average are removed since this indicates that the cameras did not capture common parts of the spherical proxy.

In some embodiments, a minimum spanning tree is then used to find trajectories that connect all visible cameras for each feature. In other embodiments, a different algorithm other an a minimum spanning tree is used to find the trajectories. Lastly, the trajectories are input into an external calibration toolbox that calculates the camera parameters.

In sum, embodiments of the invention provide a technique for highly-accurate multi-view camera calibration. Embodiments of the invention are especially useful for multiple cameras, each of which is oriented towards a common subject, rather than outward from a central point. Embodiments of the invention are simpler to implement than conventional approaches since not all of the features on the proxy need to be seen by each camera.

System Overview

FIG. 1 is a block diagram of a system 100 configured to implement one or more aspects of the present invention. System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

According to embodiments of the invention, one or more cameras can be calibrated. Certain embodiments of the invention may be implemented in software stored in system memory 104 and executed by CPU 102 and/or display processor 112. Other embodiments may be implemented as one or more shader programs executed by display processor 112. Still further embodiments may be implemented in fixed function hardware included within display processor 112. Other embodiments may be implemented as a combination of hardware and software.

Multi-Camera Calibration

Figure 2:
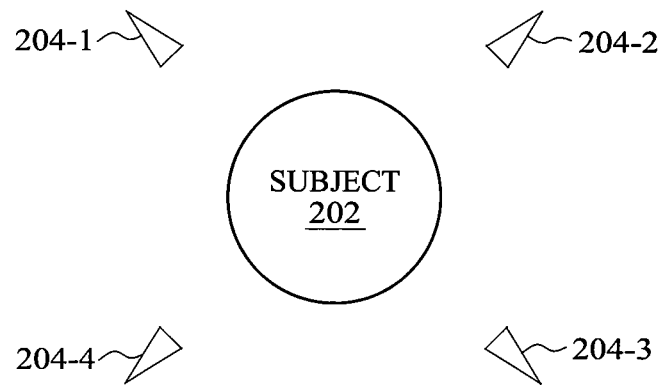
FIG. 2 illustrates a setup for performing multi-camera calibration, according to one embodiment of the invention.

Embodiments of the invention provide a technique for fast, accurate, robust, and automatic multi-camera calibration. FIG. 2 illustrates a setup for performing multi-camera calibration, according to one embodiment of the invention. A subject 202 is captured using cameras 204-1, 204-2, 204-3, 204-4. In the embodiment shown in FIG. 2, four cameras are illustrated. However, alternative embodiments of the invention may use any number of cameras. The subject 202 to be captured may be a human head. As described in greater detail herein, the subject 202 may be replaced with a proxy for performing camera calibration.

Camera calibration is the process of determining parameters for the one or more cameras that capture the subject 202. Typically, camera calibration parameters include intrinsic parameters and extrinsic parameters. Typical examples of intrinsic parameters include focal length, image format, principal point, and/or lens distortion. The extrinsic parameters define the position and orientation of the camera in world space coordinates relative to the subject being captured.

In some embodiments, the proxy used for camera calibration is a sphere. Using a spherical proxy is advantageous since the projection of a sphere is approximately a circle under typical imaging conditions (e.g., low lens distortion, small field of view), the geometry is simple for calculations, normals can be easily estimated, and the surface is equally fair to all viewpoints. In some embodiments, the sphere is approximately the same size as the subject that is going to be captured. Also, in some embodiments, the sphere has a color that is distinct from the background.

Figure 3:
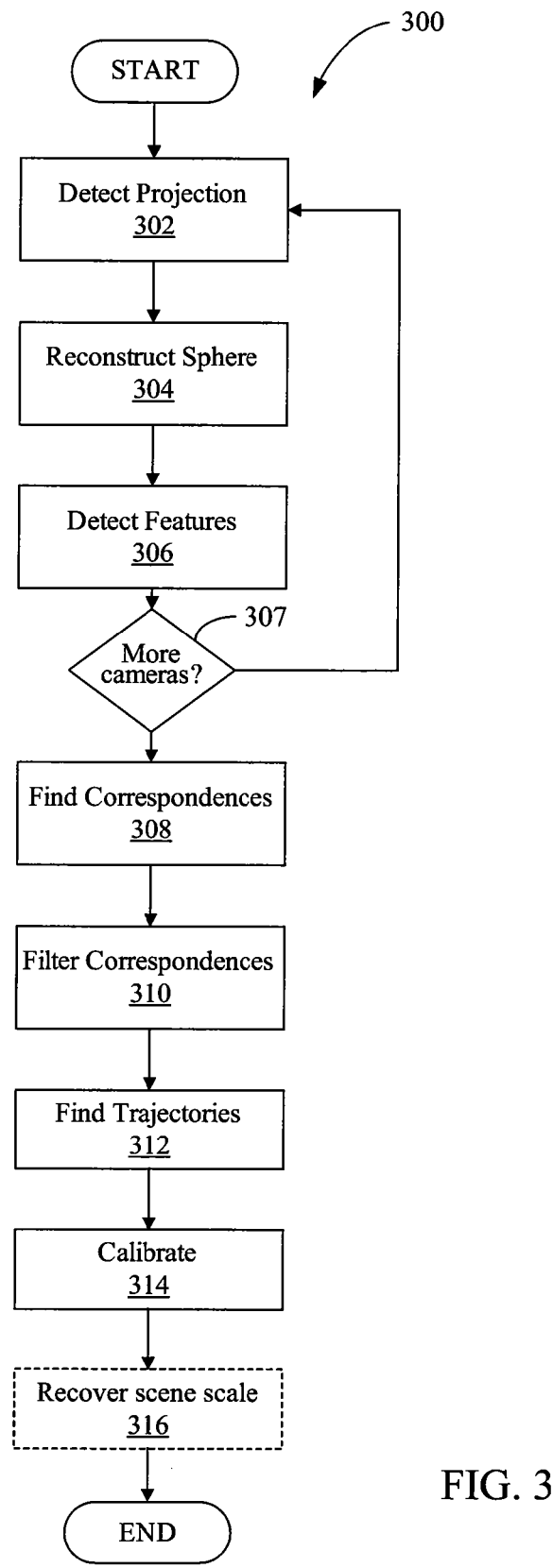
FIG. 3 is a flow diagram of method steps for multi-camera calibration, according to one embodiment of the invention.

FIG. 3 is a flow diagram of method steps for multi-camera calibration, according to one embodiment of the invention. Persons skilled in the art will understand that, even though the method 300 is described in conjunction with the system of FIGS. 1-2, any system configured to perform the method steps, in any order, is within the scope of embodiments of the invention.

As shown, the method 300 begins at step 302, where a processor detects a projection of the proxy in an image captured by a first camera. As described, in embodiments where the proxy is a sphere, the projection is approximately a circle. Since the sphere attenuates the light, some embodiments can produce a good contrast between the sphere and the background when the scene is illuminated at average intensity. For example, the background may exhibit low contrast and, therefore, a detection algorithm can be used to find the outline of the sphere. In some embodiments, the image is swept from left-to-right, top-to-bottom, right-to-left, and/or bottom-to-top until a pixel is reached where the intensity drops significantly. These pixels may be used in a circular Hough transform with variable radii to find both a center and a radius of the silhouette. To speed up the process, some embodiments may apply this algorithm in a multi-scale fashion. In embodiments where the proxy has a color that differs from the background, the image can be filtered with a spectral bandpass tuned for the colorband of the proxy. The projection can then be found by maximizing the difference of the values outside and inside the projection of the proxy for all possible projections. The projection that maximizes this difference is considered the correct one. In embodiments where the proxy is a sphere, the projection is approximately a circle and the detection process can be formulated as:

$$\left\| \frac{1}{2\pi(r+dr)} \int_0^{2\pi} I(C_{\vec{c},r+dr}(\omega)) \, d\omega - \frac{1}{2\pi(r-dr)} \int_0^{2\pi} I(C_{\vec{c},r-dr}(\omega)) \, d\omega \right\|$$

and the circle with center $\vec{c}$ and radius r that maximizes this difference is chosen. To speed up the process, some embodiments may apply this algorithm in a multi-scale fashion.

More specifically, the following derivations provide one embodiment of detecting the projection with respect to the world coordinate frame. As described, the projection of the silhouette of a sphere is approximately a circle and the ray $t_c$ $\vec{d}_c$ through the center of this circle will also pass through the center of the sphere. Furthermore, the rays $t_i \vec{d}_i$ passing through the silhouette are tangents to the sphere. The tangent point $\vec{x}_i$ lies in a plane with normal $\vec{d}_i$ through the center of the sphere $\vec{s}_i$. The distance $|\vec{s}_i - \vec{x}_i|$ should correspond to the known physical sphere radius r. Before we can cast this into a linear least squares system, we need to reparameterize the tangents with respect to $t_c$. As mentioned before, both $\vec{x}_i$ and $\vec{s}_i$ lie in the same plane and thus:

$$\langle \vec{d}_i, t_i \vec{d}_i \rangle + d_i = 0 \quad \text{(Equation 1.1), and}$$

$$\langle \vec{d}_i, t_c \vec{d}_c \rangle + d_i = 0 \quad \text{(Equation 1.1).}$$

Combining Equations 1.1 and 1.2, and rearranging the terms, yields the desired reparameterization:

$$t_i = \frac{\langle \vec{d}_i, \vec{d}_c \rangle}{\langle \vec{d}_i, \vec{d}_i \rangle} t_c \quad \text{(Equation 1.3)}$$

Assuming that the $\vec{d}_i$ are normalized, this term can be simplified to:

$$t_i = \langle \vec{d}_i, \vec{d}_c \rangle t_c \quad \text{(Equation 1.4).}$$

The problem is now formulated as a minimization problem:

$$\|\vec{D} t_c - \vec{\rho}\|^2 \to \min \quad \text{(Equation 1.5),}$$

with $D_i = \|\langle \vec{d}_i, \vec{d}_c \rangle \vec{d}_i - \vec{d}_c \|$, $\rho_i = r$ and with the additional constraint $|\vec{d}_i| = 1$. Solving this in a least squares sense produces the solution:

$$t_c = (\vec{D}^T \vec{D})^{-1} \vec{D}^T \vec{\rho} \quad \text{(Equation 1.6),}$$

and since both $\vec{D}$ and $\vec{\rho}$ are vectors, this may be rewritten as $$t_c = \frac{\langle \vec{D}, \vec{\rho} \rangle}{\langle \vec{D}, \vec{D} \rangle}. \quad \text{(Equation 1.7)}$$

The center $\vec{s}$ of the sphere is then $$\vec{s} = \vec{o} + \frac{\langle \vec{D}, \vec{\rho} \rangle}{\langle \vec{D}, \vec{D} \rangle} \vec{d}_c \quad \text{(Equation 1.8)}$$

with $\vec{o}$ being the center of the camera.

Referring again to FIG. 3, at step 304, the processor reconstructs the sphere captured by the first camera. Based on the center and radius of the sphere, a 3D reconstruction of the sphere can be achieved.

At step 306, the processor detects features placed on the outside of the sphere. As described in greater detail herein, in some embodiments, the sphere includes "features" that are placed on the outside of the sphere. For example, the features may be of a specific type or design, such as a fiducial marker or a fiducial point.

Figure 4:
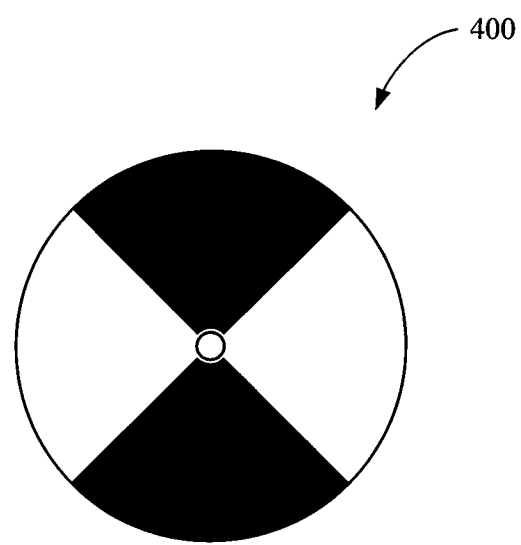
FIG. 4 illustrates a feature placed on the outside of the sphere, according to one embodiment of the invention.
Figure 5:
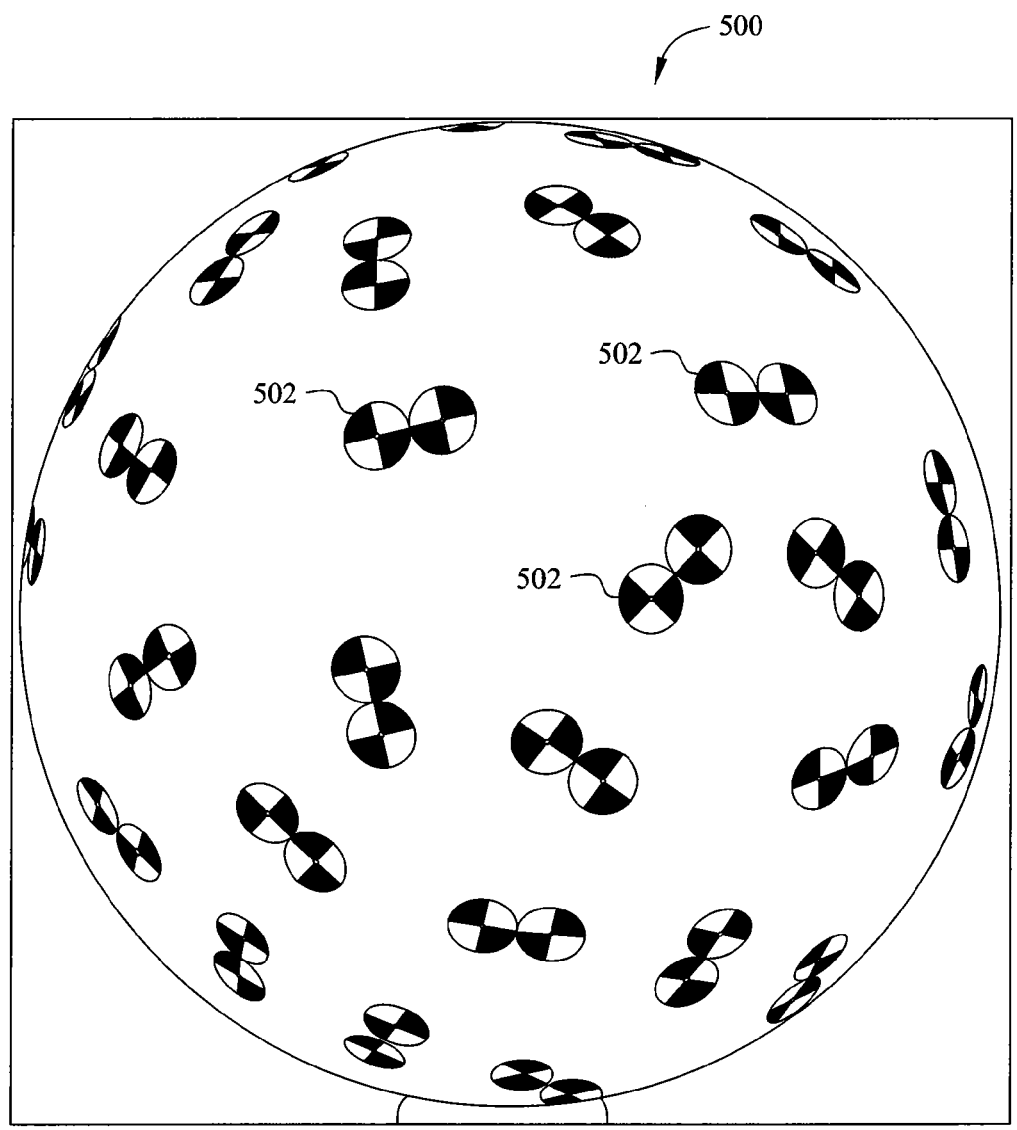
FIG. 5 illustrates a perspective view of a portion of a spherical proxy with features placed on the outside of the spherical proxy, according to one embodiment of the invention.

FIG. 4 illustrates a feature 400 placed on the outside of the sphere, according to one embodiment of the invention. As shown, the feature 400 is circular with an alternating black and white checkerboard pattern. Additionally, the feature 400 includes a colored dot at the center of the feature 400. In one embodiment, the colored dot comprises a red colored dot. In other embodiments, any color dot may be used. The features 400 may be placed around the spherical proxy and used for camera calibration, as described in further detail herein. FIG. 5 illustrates a perspective view of a portion of a spherical proxy 500 with features 502 placed on the outside of the spherical proxy 500, according to one embodiment of the invention.

Referring again to FIG. 3, detecting the features at step 306 may include detecting the colored dots at the center of each feature. In one embodiment, detecting the colored dots comprises applying a band-pass filter to the spectral distribution. Detecting the colored dots, in some embodiments, provides accuracy for the location of the feature center within a few pixels. In some embodiments, to achieve greater accuracy, the location of the feature centers may be further refined. First, the features are undistorted. As shown in FIG. 5, the features located closer to the center of the sphere appear more similar to the feature 400 shown in FIG. 4. However, the features on the periphery of the projection of the sphere are more distorted. In some embodiments, the features may be undistorted based on the surface normal at the location of the feature. Since the center and radius of the sphere are known or approximated, the distortion caused to the feature can be determined based on the distance of the projection of the feature from the center of the projection of the sphere. After the feature is undistorted, a refined location for the center of the feature can be determined by finding the intersection of the lines that form the boundary between the black and white portions of the checkerboard pattern of the feature. Refining the location of the center of the feature in this manner, in some embodiments, provides and accuracy in the sub-pixel range. As also shown in the example in FIG. 5, the features 502 may be dual features that each includes two individual features. As described in greater detail below, implementing one or more dual features may allow for shorter execution time when determining correspondences between surface features.

Referring back to FIG. 3, at step 307, the processor determines whether any additional cameras remain to be processed. If the processor determines that at least one additional cameras remains to be processed, then the method 300 returns to step 302, described above. Steps 302, 304, 306 are repeated for each camera until the features are detected in the image captured by each camera. If the processor determines that no additional cameras remain to be processed, then the method 300 proceeds to step 308.

At step 308, the processor finds correspondences between the features detected in each pair of images. For example, in a set-up that includes three cameras A, B, C, each camera captures an image of the spherical proxy. Correspondences are then found between the features in each pair of images. Accordingly, correspondences are found (i) between the features included in images captured by cameras A and B, (ii) between the features included in images captured by cameras A and C, and (iii) between the features included in images captured by cameras B and C.

In one embodiment, to find the correspondences between the features in an image pair, the features of each image are projected onto the estimated spherical reconstruction of the respective image. Then, a RANSAC (Random Sample Consensus) operation may be applied to find a rotation R that best aligns the features from the two views.

Figure 6:
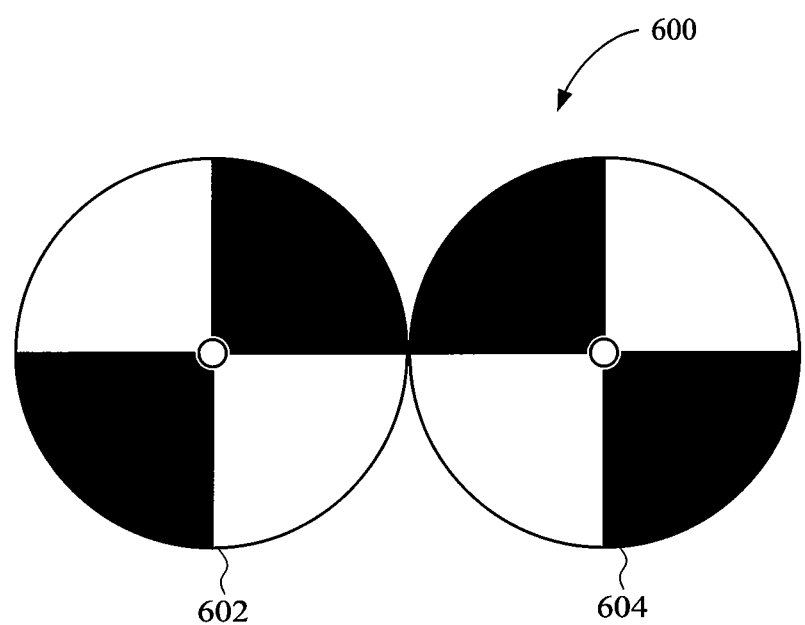
FIG. 6 illustrates a dual feature used for detecting correspondences between features in a pair of images, according to embodiment of the invention.

In some embodiments, "dual" features may be included in addition to or in place of "regular" features to allow for faster correspondence detection and to recover scene scale. FIG. 6 illustrates a dual feature 600 used for detecting correspondences between features in a pair of images, according to embodiment of the invention. As shown, the dual feature 600 includes two regular features (a left-side feature 602 and a right-side feature 604) placed adjacent to one another at a known distance. Also, the right-side 604 feature is rotated 90-degrees relative to the left-side feature 602.

Dual features may be used to facilitate detection of correspondences between features in an image pair. In one embodiment, as shown in FIG. 5, several dual features may be placed on the spherical proxy. To find the correspondences in an image pair, the algorithm detects a dual feature in a first image included in the image pair. Then, the algorithm detects a dual feature in a second image included in the image pair. The rotation that aligns these features is computed from the dual features and the estimated centers of the spherical proxy. If the rotation is correct, then the other features would also correspond to one another. Thus, the processor may determine whether the other features correspond to one another in the image pair. If the processor determines that the other features also correspond to one another, i.e., there is proper alignment between the features in the first image and the features in the second image, then the correspondences have been properly determined. If the processor determines that other features do not correspond to one another, then a different pair of dual features is selected from the two images. Once again, the other features are compared for proper alignment until the correct correspondences between the two images are found. The information to establish the correspondences is not stored in the individual features, but in their global random distribution on the calibration proxy. This allows the design of the features to focus completely on accurate detection and localization. In the example shown in FIG. 5, only dual features are used to implement embodiments of the invention. In other embodiments, only individual features may be used. In still further embodiments, a combination of individual and dual features may be used.

Additionally, in some embodiments, since the orientation of the two features included in the dual feature is known, the computational complexity of determining the proper correspondences between the two images can be reduced by an order of two (i.e., is twice as fast) since there is only one proper way to align the respective left-side feature 602 and right-side feature 604 included in the dual feature 600.

Referring back to FIG. 3, at step 310, the processor filters the correspondences to remove mistaken matches. In some embodiments, once correspondences are determined for each pair of images, the position of sphere S2 and the rotation R are refined to minimize the joint error of all correspondences in 3-space. The correspondences that have an error substantially above the average are then removed and the refinement repeated. These two steps are iterated until no more features have to be removed. Additionally, in some embodiments, entire correspondence sets between two images can be removed from further calculation when an overall error for the correspondence set is substantially above a certain threshold, since such an overall error indicates that the two cameras did not capture common parts of the spherical proxy.

At step 312, the processor finds trajectories between correspondence sets. Finding trajectories includes combining together the correspondence sets to form one complete set of features. In one embodiment, the trajectories are found based on calculating, for each feature in each correspondence set, a minimum spanning tree that connects the visible cameras. In other words, the minimum spanning tree makes sure that all of the features map uniquely to feature-projections in each of the other cameras and that maximally one feature projection per image maps to a specific feature. In other embodiments, any technically feasible algorithm, other than a minimum spanning tree, may be used to find the trajectories.

At step 314, an external toolbox calibrates the camera based on the trajectories. As described, camera calibration includes calculating intrinsic and extrinsic parameters for each camera. Various third party toolboxes are known and can be used to implement step 314. In some embodiments, the toolboxes calibrate the cameras up to scale.

At step 316, the processor recovers the scale of the scene. In some embodiments, recovering the scene scale is achieved using the known distances of the centers of the dual features. A global scene scale is computed by minimizing the difference of the current distance of the centers of the dual features and the intended distance in a least squares sense. The scale is then applied to the cameras. In some embodiments, step 316 is optional and may be omitted.

In sum, embodiments of the invention provide a technique for highly-accurate multi-view camera calibration. Embodiments of the invention are especially useful for multiple cameras, each of which is oriented towards a common subject, rather than outward from a central point. According to embodiments of the invention, the cameras can be calibrated with approximately one to three shots, whereas prior art approaches require 500 shots or more to calibrate the cameras. Since camera calibration is repeated often to maintain high accuracy for reconstructions, an efficient and effective technique for camera calibration is highly desirable. Embodiments of the invention provide an improved technique for camera calibration, since the process is very quick and can be implemented fully automatically.

One advantage of embodiments of the invention is simplicity of implementation compared to prior art techniques. In contrast to prior art approaches, such as the checkerboard approach, every feature does not need to be visible to each camera when calibrating using embodiments of the invention. Another advantage is that the proxy can be any shape. Yet another advantage is that the calibration can still be performed even when the proxy is only partially captured by each of the cameras. Still another advantage is that the cameras can be calibrated with one to three shots, rather than 500 or more shots, as required by prior art techniques. Yet another advantage of the techniques described herein is that manufacturing of the calibration proxy object and the feature tags is quite simple and inexpensive. For example, the feature tags may be printed onto stick-on paper and attached to a roughly spherical object, such as a plastic sphere. The overall cost of such a calibration proxy object and feature tags may be as low as $10.00.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for calibrating a plurality of cameras, the method comprising:
    for each camera of the plurality of cameras, detecting a projection of a proxy object included in an image captured by the camera;
    for each camera of the plurality of cameras, detecting surface features associated with the proxy object included in the image captured by the camera and based on the respective projection;
    for each distinct pairing of two different cameras from the plurality of cameras, determining a correspondence set that maps the surface features detected by one camera in the pairing to the surface features detected by the other camera in the pairing;
    based on the determined correspondence sets, determining at least one of the position and rotation of the proxy object; and
    generating trajectories between surface features based on relationships between the determined correspondence sets and the determined at least one of the position and rotation of the proxy object,
    wherein the trajectories can be used to generate camera calibration parameters for each camera of the plurality of cameras.

2. The method of claim 1, wherein the proxy object comprises a sphere.

3. The method of claim 1, wherein each of the surface features comprises a circular shape having a checkerboard pattern.

4. The method of claim 3, wherein each of the surface features includes a colored dot located at the center of the surface feature.

5. The method of claim 4, wherein the colored dot comprises a known color.

6. The method of claim 4, wherein, for a first camera of the plurality of cameras, detecting the surface features associated with the proxy object comprises detecting a location for each of the colored dots in a first image captured by the first camera.

7. The method of claim 6, wherein detecting the location of each of the colored dots in the first image comprises applying a band-pass filter to a spectral distribution of the first image.

8. The method of claim 1, wherein detecting the surface features associated with the proxy object comprises undistorting the surface features to refine a location of each of the surface features.

9. The method of claim 1, wherein, for a first pairing of two different cameras, determining a correspondence set comprises performing a RANSAC (Random Sample Consensus) operation on the detected surface features associated with the proxy object.

10. The method of claim 1, wherein one or more of the surface features comprises a dual surface feature that includes a left-side feature and a right-side feature that are adjacent to each other.

11. The method of claim 10, wherein, for a first pairing of two different cameras, determining a correspondence set comprises associating a first dual surface feature associated with the proxy object included in the image captured by one camera in the combination of two different cameras with a second dual surface feature associated with the proxy object included in the image captured by the other camera in the combination of two different cameras.

12. The method of claim 1, further comprising based on the determined at least one of the position and rotation of the proxy object, filtering each of the determined correspondence sets based on a respective error threshold, wherein filtering each of the determined correspondence sets comprises removing correspondences between surface features having an associated error that is greater than a threshold value.

13. A non-transitory computer-readable storage medium storing instructions that, when executed by a processor, cause a computer system to calibrate a plurality of cameras, by performing an operation comprising:
    for each camera of the plurality of cameras, detecting a projection of a proxy object included in an image captured by the camera;
    for each camera of the plurality of cameras, detecting surface features associated with the proxy object included in the image captured by the camera and based on the respective projection;
    for each distinct pairing of two different cameras from the plurality of cameras, determining a correspondence set that maps the surface features detected by one camera in the pairing to the surface features detected by the other camera in the pairing;
    based on the determined correspondence sets, determining at least one of the position and rotation of the proxy object; and
    generating trajectories between surface features based on relationships between the determined correspondence sets and the determined at least one of the position and rotation of the proxy object,
    wherein the trajectories can be used to generate camera calibration parameters for each camera of the plurality of cameras.

14. The computer-readable storage medium of claim 13, wherein the proxy object comprises a sphere.

15. The computer-readable storage medium of claim 13, wherein each of the surface features comprises a circular shape having a checkerboard pattern.

16. The computer-readable storage medium of claim 15, wherein each of the surface features includes a colored dot located at the center of the surface feature.

17. The computer-readable storage medium of claim 16, wherein the colored dot comprises a known color.

18. The computer-readable storage medium of claim 16, wherein, for a first camera of the plurality of cameras, detecting the surface features associated with the proxy object comprises detecting a location for each of the colored dots in a first image captured by the first camera.

19. The computer-readable storage medium of claim 18, wherein detecting the location of each of the colored dots in the first image comprises applying a band-pass filter to a spectral distribution of the first image.

20. The computer-readable storage medium of claim 13, wherein detecting the surface features associated with the proxy object comprises undistorting the surface features to refine a location of each of the surface features.

21. The computer-readable storage medium of claim 13, wherein, for a first pairing of two different cameras, determining a correspondence set comprises performing a RANSAC (Random Sample Consensus) operation on the detected surface features associated with the proxy object.

22. The computer-readable storage medium of claim 13, wherein one or more of the surface features comprises a dual surface feature that includes a left-side feature and a right-side feature that are adjacent to each other.

23. The computer-readable storage medium of claim 22, wherein, for a first pairing of two different cameras, determining a correspondence set comprises associating a first dual surface feature associated with the proxy object included in the image captured by one camera in the pairing with a second dual surface feature associated with the proxy object included in the image captured by the other camera in the pairing.

24. The computer-readable storage medium of claim 13, further comprising based on the determined at least one of the position and rotation of the proxy object, filtering each of the determined correspondence sets based on a respective error threshold, wherein filtering each of the determined correspondence sets comprises removing correspondences between surface features having an associated error that is greater than a threshold value.

25. A system for calibrating a plurality of cameras, the system comprising:
a processor configured to:
for each camera of the plurality of cameras, detect a projection of a proxy object included in an image captured by the camera;
for each camera of the plurality of cameras, detect surface features associated with the proxy object included in the image captured by the camera and based on the respective projection;
for each distinct pairing of two different cameras from the plurality of cameras, determine a correspondence set that maps the surface features detected by one camera in the pairing to the surface features detected by the other camera in the pairing;
based on the determined correspondence sets, determine at least one of the position and rotation of the proxy object; and
generate trajectories between surface features based on relationships between the determined correspondence sets and the determined at least one of the position and rotation of the proxy object,
wherein the trajectories can be used to generate camera calibration parameters for each camera of the plurality of cameras.

26. The system of claim 25, further comprising a memory storing instructions that, when executed by the processor, configure the processor to:
for each camera of the plurality of cameras, detect the projection of the proxy object;
for each camera of the plurality of cameras, detect the surface features;
for each distinct pairing of two different cameras from the plurality of cameras, determine the correspondence set; and
generate correspondences between surface features.

* * * * *

UNITED STATES PATENT AND TRADEMARK OFFICE
CERTIFICATE OF CORRECTION

| | | |
|---|---|---|
| PATENT NO. | : 8,917,317 B1 | |
| APPLICATION NO. | : 12/689173 | |
| DATED | : December 23, 2014 | |
| INVENTOR(S) | : Thabo Dominik Beeler | |

It is certified that error appears in the above-identified patent and that said Letters Patent is hereby corrected as shown below:

Title Page, (73) Assignee:

Please delete "Disney Enterprises, Inc., Burbank, CA (US)" and insert -- Disney Enterprises, Inc., Burbank, CA (US); ETH Zurich (Eidgenoessische Technische Hochschule Zurich), Zurich (CH) -- therefor Signed and Sealed this
Fifth Day of January, 2016

Michelle K. Lee
*Director of the United States Patent and Trademark Office*